(12) United States Patent
Wiebe et al.

(10) Patent No.: US 7,202,963 B2
(45) Date of Patent: Apr. 10, 2007

(54) METHOD FOR PROCESSING INFORMATION

(75) Inventors: Linus Wiebe, Lund (SE); Per Höglin, Sundbyberg (SE); Christer Fåhraeus, Lund (SE)

(73) Assignee: Anoto AB, Lund (SE)

( * ) Notice: Subject to any disclaimer, the term of this patent is extended or adjusted under 35 U.S.C. 154(b) by 997 days.

(21) Appl. No.: 10/180,525

(22) Filed: Jun. 27, 2002

(65) Prior Publication Data

US 2003/0016386 A1    Jan. 23, 2003

Related U.S. Application Data

(60) Provisional application No. 60/316,026, filed on Aug. 31, 2001.

(30) Foreign Application Priority Data

Jun. 28, 2001  (SE)  ................... 0102294

(51) Int. Cl.
*B41J 1/00* (2006.01)
*G06F 15/00* (2006.01)
*H04N 1/00* (2006.01)
*G06K 11/06* (2006.01)
*G09G 5/00* (2006.01)

(52) U.S. Cl. .................. 358/1.15; 358/402; 178/18.01; 178/19.05; 345/175; 345/179

(58) Field of Classification Search ............... 358/1.15, 358/402; 382/314–315, 317, 196; 715/541; 345/156, 175, 179; 341/13; 178/18.01
See application file for complete search history.

(56) References Cited

U.S. PATENT DOCUMENTS 5,652,412 A * 7/1997 Lazzouni et al. ........ 178/18.01

6,738,053 B1 * 5/2004 Borgstrom et al. ......... 345/179

FOREIGN PATENT DOCUMENTS

| GB | 2202664 A | 9/1988 |
|---|---|---|
| GB | 2354824 A | 4/2001 |
| WO | WO 98/20446 | 5/1998 |
| WO | WO 00/72243 A1 | 11/2000 |
| WO | WO 00/72244 | 11/2000 |
| WO | WO 01/22208 A1 | 3/2001 |
| WO | WO 01/26033 A1 | 4/2001 |
| WO | WO 01/30589 A1 | 5/2001 |
| WO | WO 01/71475 A1 | 9/2001 |
| WO | WO 01/71653 | 9/2001 |

* cited by examiner

*Primary Examiner*—Kimberly Williams
*Assistant Examiner*—Charlotte M. Baker
(74) *Attorney, Agent, or Firm*—Birch, Stewart, Kolasch & Birch, LLP

(57) ABSTRACT

The present invention relates to a method for generating a message that is intended to be sent to a destination. The method is characterized by the steps of sending an address parameter, that corresponds to the destination, to a printer unit; printing out a sheet of paper using the printer unit, which sheet of paper comprises a position-coding pattern and the address parameter; generating an information sequence by writing on the sheet of paper with a drawing device, which drawing device is capable of detecting positions on the sheet of paper by reading the position-coding pattern; recording the address parameter using the drawing device; and combining the recorded address parameter with the information sequence into a message.

35 Claims, 2 Drawing Sheets

METHOD FOR PROCESSING INFORMATION

This application claims priority on provisional Application No. 60/316,026 filed on Aug. 31, 2001, the entire contents of which are hereby incorporated by reference.

TECHNICAL FIELD

The present invention relates to a method and computer program product for generating an electronic message including handwritten information.

BACKGROUND TO THE INVENTION

E-mail systems of various types are used to a very great extent. The main reasons for the widespread use of these systems is that they make possible rapid and efficient written communication without being associated with high costs.

Known systems for e-mail management have, however, a number of limitations. An e-mail message that is generated in the normal way in a personal computer is, in general, restricted to containing text in the form of ASCII characters and in addition attached files, which can be of various types.

In addition, access to a personal computer of some type is normally assumed for the production of a message, which makes mobile use difficult. It is true that portable digital tools are available to a certain extent, in the form of mobile telephones and so-called PDAs, which can have e-mail applications, but users are then, in general, constrained to very limited display and entry functions, which complicates the creation of a message.

SUMMARY OF THE INVENTION

An object of the present invention is to solve the above-mentioned problem completely or partially.

This object is achieved by means of a method for generating a message according to claim 1, a computer program according to claim 11, a storage medium according to claim 12, a method according to claim 13, a computer program according to claim 19, a storage medium according to claim 20, and an electronic mail client according to claim 21.

According to a first aspect of the invention, this relates more specifically to a method for generating a message that is intended to be sent to a destination. The method is characterized by the steps of sending an address parameter, that corresponds to the destination, to a printer unit; printing out a sheet of paper using the printer unit, which sheet of paper comprises a position-coding pattern and said address parameter; generating an information sequence by writing on the sheet of paper with a drawing device, which drawing device is capable of detecting positions on the sheet of paper by reading the position-coding pattern; recording the address parameter using the drawing device; and combining the recorded address parameter with the information sequence into a message.

Messages can thereby be completed in a drawing device, without access to a personal computer or a digital tool of the above-mentioned type. An input surface, which is almost the same size as a printed-out sheet of paper, can nevertheless be used. In addition, handwritten, more expressive messages can be created.

According to a preferred embodiment, the address parameter comprises at least information corresponding to an address in an e-mail system.

This enables a fully complete message to be created in the drawing device.

According to an alternative embodiment, the address parameter comprises at least a reference identity, that identifies an address in a server unit.

This enables the server unit to maintain information concerning relationships between different messages, for example the fact that a message constitutes a reply to another message.

According to a preferred embodiment, the message can be a reply to an incoming message, the address parameter corresponding to the address of at least the sender of the incoming message.

This makes it possible to reply to a message in a simple way.

Information in the incoming message can preferably also be printed out on the sheet of paper.

The user can thus print out the sheet of paper and later, also without access to a personal computer, read and reply to the incoming message.

In a preferred embodiment, the positional relationship on the sheet of paper between the information in the incoming message and the information sequence can be recorded. The information in the incoming message can thus be included in the generated message with said positional relationship retained.

This makes it possible for a user to write annotations directly in an incoming message.

In a preferred embodiment, the message can be intended to be sent to a selectable subset of a group of recipients, the identities of this group of recipients being printed out on the sheet of paper.

The user can thus simply choose to which potential recipients the message is to be sent.

The recorded address information and the information sequence can preferably be combined in the drawing device. Preferably, a number of such messages are stored in the drawing device and are subsequently sent, when the drawing device makes contact with a network.

The drawing device can thus store a number of completed messages as a stand-alone device and then send them when contact is made with a suitable network.

Alternatively, the recorded address information and the information sequence can be transmitted from the drawing device to a server unit, with the address information and the information sequence being combined in the server unit.

This enables the server unit to maintain information concerning relationships between different messages, for example the fact that one message constitutes a reply to another message.

According to a second aspect of the invention, this relates to a computer program for generating a message that is intended to be sent to a destination. The program is characterized by instructions corresponding to the step of sending an address parameter, that corresponds to the destination, to a printer unit, which is intended to print out the address parameter and a position-coding pattern on a sheet of paper, an information sequence being intended to be generated by writing on the sheet of paper with a drawing device, which drawing device is capable of detecting positions on the sheet of paper by reading the position-coding pattern, the address parameter being intended to be recorded using the drawing device, and the recorded address parameter being intended to be combined with the information sequence into a message. According to a third aspect, the invention relates to a digital storage medium comprising such a computer program.

The computer program and hence the storage medium have corresponding advantages to the method described above. In addition, they can be varied in similar ways to this.

According to a fourth aspect, the invention relates to a method for generating a message, which is a reply to an incoming message and which is intended to be sent to a destination. The method includes the steps of: sending an address parameter, that corresponds to the address of the sender of the incoming message, to a printer unit; printing out a sheet of paper using the printer unit, which sheet of paper comprises a position-coding pattern, the incoming message and said address parameter; generating an information sequence by writing on the sheet of paper with a drawing device, which drawing device is capable of detecting positions on the sheet of paper by reading the position-coding pattern; recording the address parameter using the drawing device; and combining the recorded address parameter with the information sequence into a message.

This method allows a user to complete a large number of such messages offline, only using the printed out sheets of paper and the drawing device.

Preferably, the sheet is printed in such a way, that it comprises a message box, containing the incoming message, and a reply box, in which the user is intended to write in order to generate the information sequence. In a preferred embodiment, the message box and the reply box are visually separated.

This facilitates the use of the method for the user.

Preferably, the positional relationship on the sheet of paper between the information in the incoming message and the information sequence is recorded and in which the information in the incoming message is included in the generated message with said positional relationship retained.

This allows a user to comment an incoming message in the text of this message and to send the commented message as a reply message.

In a preferred embodiment, additional information is sent to the printer unit, such that the printed sheet contains address parameters corresponding to other recipients of the incoming message.

This allows a user to create a reply message with multiple, selectable recipients.

Preferably, the printed sheet further comprises an address parameter corresponding to the sender of the incoming message as well as all other recipients of the incoming message.

This corresponds to a "reply-all"-option and facilitates the use of the printed sheet, for the user.

According to a fifth aspect, the invention relates to a computer program for generating a message, which is a reply to an incoming message and which is intended to be sent to a destination. The program includes instructions corresponding to the step: sending an address parameter, that corresponds to the address of the sender of the incoming message, to a printer unit, the printer unit being intended to print out a sheet of paper, which sheet of paper comprises a position-coding pattern, the incoming message and said address parameter, an information sequence being intended to be generated by writing on the sheet of paper with a drawing device, which drawing device is capable of detecting positions on the sheet of paper by reading the position-coding pattern, the address parameter being intended to be recorded using the drawing device, and the recorded address parameter being intended to be combined with the information sequence into a message. According to a sixth aspect, the invention relates to a storage medium comprising such a program.

The program according to the fifth aspect, as well as the storage medium according to the sixth aspect, implies similar advantages as the method according to the fourth aspect and may be varied in a corresponding manner.

According to a seventh aspect, the invention relates to an electronic mail client for installation on a device for communication with a mail server located in any domain on the Internet, said device being connected to a network communications interface to the Internet, a printer unit and an electronic display, said electronic mail client comprising the instructions: to display on the electronic display, upon receipt of an incoming electronic mail message from the mail server, the incoming electronic mail message; to display on the electronic display an option for generating, based on the incoming electronic mail message, an electronic reply message including handwritten information; and upon detection of a selection of said option, to send an address parameter, that corresponds to the Internet mail address of the sender of the incoming electronic mail message, to a printer unit, the printer unit thereby being controlled to print out a sheet of paper comprising a position-coding pattern and said address parameter, an information sequence being intended to be generated by writing on the sheet of paper with a drawing device, which drawing device is capable of detecting positions on the sheet of paper by reading the position-coding pattern, the address parameter being intended to be recorded using the drawing device, and the recorded address parameter being intended to be combined with the information sequence to form said electronic reply message including handwritten information.

Such a mail client/program may be used in connection with a method according to the first aspect of the invention and provides a user with the option to generate a handwritten message.

In a preferred embodiment, the mail client further comprises the instruction to combine the information sequence and the address parameter, upon receipt thereof from the drawing device, to form said electronic reply message including handwritten information.

This allows the completion of handwritten mail messages in a single unit, such as a personal computer.

Preferably, the mail client includes an instruction to send contents of the incoming electronic mail message to the printer unit, the printer unit thereby being controlled to also print out said contents on the sheet of paper.

This allows reading and responding to a message, using a single sheet of paper.

In a preferred embodiment, the mail client comprises the instructions to store said contents of the incoming electronic mail message in a memory associated with said device, and to retrieve, upon said receipt of the information sequence and the address parameter from the drawing device, said contents from the memory and combine said contents and the information sequence and the address parameter to form said electronic reply message including handwritten information. Preferably, it also comprises the instructions to associate the position-coding pattern with said contents of the incoming electronic mail message, to thereby control the printer unit to print out said contents in a given positional relationship to said position-coding pattern, and to combine said contents and the information sequence with said positional relationship retained.

This allows a reply message to include an annotation of the incoming message.

In a preferred embodiment, the mail client comprises the instruction to extract the address parameter from the incoming electronic mail message as received from the mail server.

It preferably also comprises the instruction to send the information sequence and the address parameter, upon receipt thereof, to the mail server.

This allows the mail server to combine the message and thus to maintain relation between incoming and outgoing messages. This can be done even if the printout is initiated by a first client and the information sequence is received by a second client, which provides for enhanced mobility.

Preferably, the mail client further comprises the instruction to send contents of the incoming electronic mail message to the printer unit, the printer unit thereby being controlled to also print out said contents on the sheet of paper. This allows reading and responding to a message, using a single sheet of paper.

In a preferred embodiment, the mail client further comprises instructions to associate said position-coding pattern with said contents of the incoming electronic mail message, to thereby control the printer unit to print out said contents in a given positional relationship to said position-coding pattern, so that said information sequence is generated with said given positional relationship to said contents, and to send the information sequence to the mail server with said positional relationship retained. This allows, even if the message is completed in a mail server, a reply message to include an annotation of the incoming message.

In a preferred embodiment, the address parameter is a reference identity of the position-coding pattern to be printed on said the sheet of paper. The reference identity preferably corresponds to a range of positions coded by the position-coding pattern to be printed on the sheet of paper.

This allows the user to generate the message and record the address parameter simultaneously, which simplifies the use of the paper product.

Preferably, the address parameter is a reference identity that identifies said Internet mail address in the device or in the mail server. This entails a simple procedure, that may be easily implemented.

Preferably, the client according to the seventh aspect of the invention comprises the instruction to transmit contents of the incoming electronic mail message to the drawing device. This provides the drawing device with information regarding the incoming message, which information may be used when a reply message, generated with the drawing devices, is to be sent. This need not necessarily be done with the computer in which the mail client is running.

Preferably, the instruction to transmit comprises to send said contents to the printer unit, the printer unit thereby being controlled to also print out said contents on the sheet of paper in a format that the drawing device is capable of reading. This allows the drawing device to record information from the incoming message without communicating directly with the mail client.

Preferably, the address parameter comprises said Internet mail address. The printer unit may be controlled to write said Internet mail address in plain language on the sheet of paper. This entails a simple procedure, since, as long as the drawing device can perform Optical Character Recognition (OCR), it may itself determine the address.

Alternatively, the printer unit may be controlled to code said Internet mail address on said sheet of paper in a format that the drawing device is capable of reading. The drawing device then need not comprise OCR-software.

DESCRIPTION OF PREFERRED EMBODIMENTS

Figure 1:
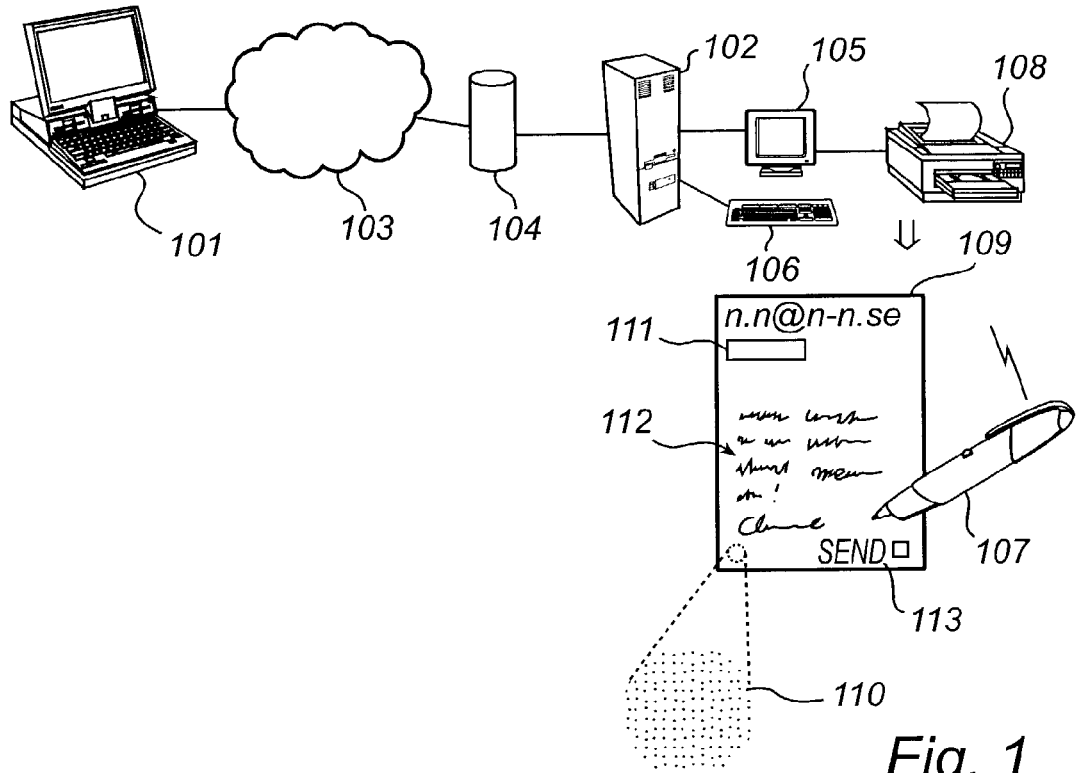
FIG. 1 shows a situation in which a method according to an embodiment of the present invention is used.

FIG. 1 shows a situation in which a method according to an embodiment of the invention is used. A first personal computer 101, that has access to an e-mail address "n.n@n-n.se" sends a message to a second personal computer 102 via the Internet 103 and an e-mail server 104. A receiving user can read the message and reply to this in a known way using a display 105 and a keyboard 106 which are connected to the second personal computer 102.

According to this embodiment of the present invention, a reply message is, however, to be produced using a drawing device 107 of the type described in WO 01/26033, which is hereby incorporated by reference. In this way, a handwritten, more expressive reply to a message can be generated and sent.

This procedure can be initiated by the user selecting a "handwritten reply" option in an interface of the e-mail program in the second personal computer 102, which received the message to which a reply is to be sent.

Figure 2:
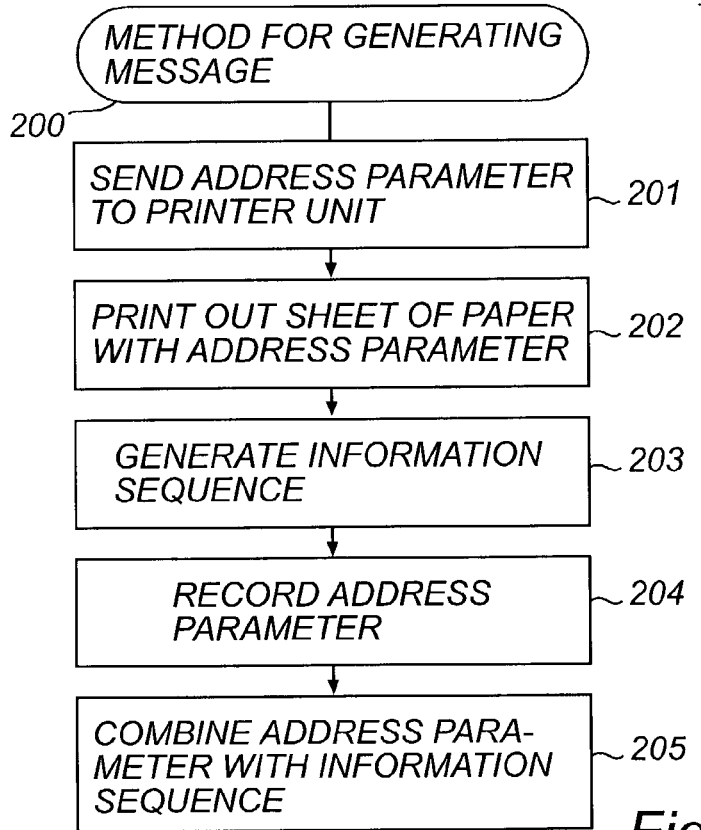
FIG. 2 shows a flow chart for a method according to an embodiment of the present invention.

A method according to an embodiment of the invention comprises the following steps, which are also illustrated with reference to FIG. 2. In a first step 201, an address parameter that corresponds to the destination, that is an e-mail account associated with the first personal computer 101, is sent to a printer unit 108. The term address parameter will be described in greater detail below, but comprises, in this example, information that is sufficient to be able to identify the e-mail address associated with the first personal computer 101. In a second step 202, a sheet of paper 109 is printed out using the printer unit 108. The sheet of paper 109 comprises a position-coding pattern 110 (shown enlarged) and, in addition, the address parameter, coded in a field 111 on the surface of the sheet of paper 109. How the address parameter can be coded on the sheet of paper will be described in greater detail below. The original message can also be printed on the sheet of paper. The position-coding pattern can be pre-printed on the sheet of paper, or can be printed out at the same time as the address parameter is printed out.

In a third step 203, an information sequence is generated by the user writing with the drawing device 107 on the sheet of paper. The drawing device 107 is capable of detecting positions on the sheet of paper, by reading off the position-coding pattern optically. When the user writes a message 112 on the sheet of paper 109 using the drawing device 107, which is preferably provided with a drawing nib, an information sequence is thus recorded in the form of a series of position data, which constitutes a digital copy of the message that was written down.

In a fourth step 204, the address parameter 111 is recorded using the drawing device 107. This can be carried out optically, as will be shown below. In the example, the address parameter is recorded by the drawing device being passed over the field 111 in which the address parameter is coded. While carrying out this recording, the drawing device 107 in the example can derive the email address "n.n@n-n.se", to which the message is intended to be sent.

In a fifth step 205, the recorded address parameter is combined with the information sequence into a message. This can be carried out when a "send" icon 113 on the sheet of paper 109 is marked, which means that positions in the icon 113 are detected by the drawing device 107, which is thereby informed that the information sequence 112 is completed. Thus, in the example, a reply message comprising an information sequence and an address has been generated. This reply message can now be sent by the drawing device 107, for example over a radio interface. The reply message can be sent via the second personal computer 102 which received the original message, but it is also possible, for example, to send the message directly from the drawing device 107 to the e-mail server 104. The drawing device 107 is preferably provided with a memory, which enables a plurality of messages to be completed in the drawing device 107 and then sent at a time when the user has access to, for example, a personal computer connected to the Internet.

The invention also relates to a computer program for printing out a sheet of paper as described above in connection with FIG. 2. The computer program contains instructions essentially corresponding to steps 201 and 202. Such a computer program can be stored on a digital storage medium.

By an address parameter is meant an address or other information that can be utilized to identify or derive an address.

In an embodiment of the invention, the address parameter can be an e-mail address, for example "n.n@n-n.se", as shown above. For other types of electronic message systems, other types of address are, of course, possible.

If the message that is to be generated is a reply to an incoming message, an identity number corresponding to the incoming message can also constitute an address parameter. The user then records the identity of the incoming message to which a reply is to be sent. The address that corresponds to the identity is obtained from the e-mail server 104 when the message is to be sent.

Figure 3:
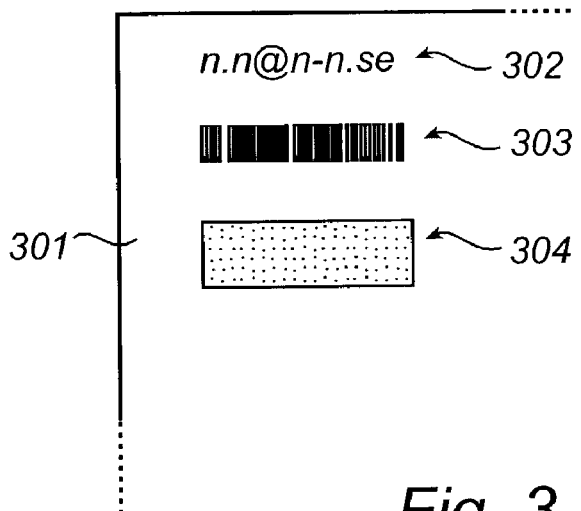
FIG. 3 shows a sheet of paper provided with coded address parameters according to embodiments of the present invention.

FIG. 3 shows different ways of coding an address parameter and printing this out on a sheet of paper 301, so that it can be recorded by a drawing device 107.

A first possibility is to print out the address parameter in clear text, as shown at 302. The drawing device 107 in FIG. 1 can then record this optically and utilize known OCR technology (OCR =Optical Character Recognition) for digital interpretation of the address parameter. The drawing device has then preferably a capability of recording text, which capability corresponds to that described in WO 98/20446, which document is hereby incorporated by reference.

A second possibility is to code the address parameter as a bar code 303. This provides, as a rule, a more reliable recording method than OCR interpretation.

An additional method is to code the address parameter in the position-coding pattern that can also be used for other purposes by the drawing device 107 in FIG. 1. This can be carried out by entering a position-coding pattern in a box 304, where the sequence of positions that is recorded when the drawing device 107 in FIG. 1 is passed over the box 304 can be interpreted as an address parameter by means of software. This can be achieved by a certain position being made to represent, for example, a particular alphanumeric character. This can also be carried out as shown in the application WO, 01/71653, A1, which is hereby incorporated by reference.

Figure 4:
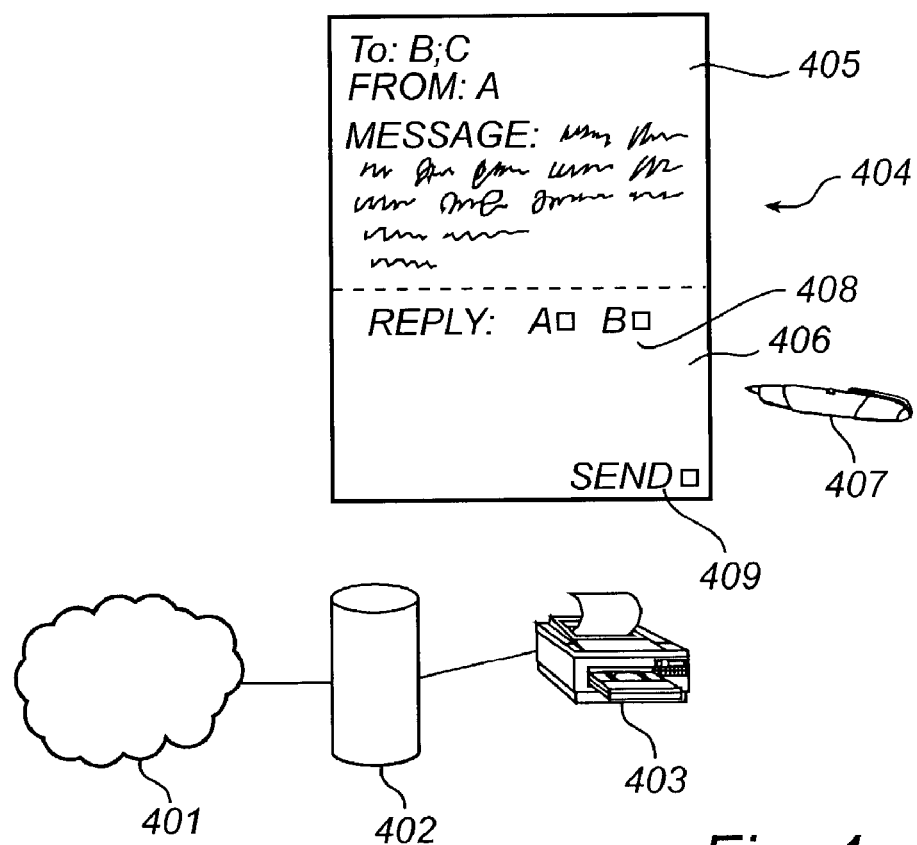
FIG. 4 shows an additional situation where a method according to an embodiment of the present invention is used.

FIG. 4 shows how an e-mail service that is independent of a PC can be designed according to an embodiment of the invention. A message is received from the Internet 401 by an e-mail server 402, which message is intended to be forwarded to a recipient. The message is forwarded to a printer unit 403 in the vicinity of the user. It can be predetermined to which printer the message is to be forwarded, but the choice of printer can also be carried out dynamically. Since drawing devices of the type mentioned earlier are normally allocated unique identity numbers, it is possible to address a message to a particular drawing device. It is thus possible to register the drawing device as belonging to a particular printer unit, but it is also possible to carry out paging of a drawing device if this is equipped with a radio interface. In such cases, a message can be printed out on the printer that is closest to the drawing device. In addition, the user of the drawing device can be made aware that a message has been sent to a printer unit in the vicinity by means of, for example, a sound signal from the drawing device.

A further possibility is to send the message to a mobile telephone. The user of the mobile telephone can thereafter, for example by means of a short-range radio interface, transfer the message to a printer unit that happens to be in the vicinity. It should be understood that the computer unit 102 shown in FIG. 1 as a personal computer can also be replaced by a mobile telephone which receives messages, for example via a packet data radio system such as GPRS, and which can communicate information to a printer unit, for example using a short-range radio interface such as BLUE-TOOTH. The functions in a mobile telephone can thus constitute a computer unit.

The selected printer unit 403 prints out the received message in a message box 405 on a sheet of paper 404. The user can thus read the message and is also given the ability to reply to this in a "reply" box 406 on the same sheet of paper 404 or on a separate sheet of paper. The user then uses a drawing device 407 of the type described above and writes his reply in the "reply" box 406, which is provided with a position-coding pattern (not shown) of the type described above. The reply is thereby recorded digitally in the drawing device 407 as a sequence of positions. The "reply" box 406 may be visually separated from the message box 405, for instance, as is illustrated in FIG. 4, by means of a dashed line.

If the received message is printed out on the sheet of paper that comprises a position-coding pattern, this makes it possible to annotate the text in the original message as shown by an example in the application WO, 01/71475, A1, which is hereby incorporated by reference.

The address parameter consists in this case preferably of an identity reference, that identifies the original message in an e-mail server. The user writes annotations in the original text. The message written by the user is recorded as a sequence of positions. The e-mail server can combine the original message with the message written by the user, so that the latter becomes annotations on the former. The positional relationship between the original message and the text written by the user must then also be recorded. This can be carried out by the original message being printed out in a predetermined way or by the way in which the original message is printed out being communicated to the e-mail server. The original message with annotations can thereafter be sent back to the sender of the original message and/or to other recipients.

The user also records at least one printed-out address parameter 408. It can be an address parameter corresponding to the sender of the original message or an address parameter corresponding to another of the recipients of the original message. It can also be an address parameter corresponding to a group of recipients, for example "reply to all".

When the message is complete and the choice of recipient for it has been made, the user marks a "send" icon 409, which indicates to the drawing device 407 (for example by recording special positions in the icon) that the message is ready. It is then sent to its recipient(s). This can be carried out by radio communication between the drawing device 407 and the printer unit 403 or the server unit 402.

The invention is, of course, not limited to the embodiments shown above, but can be varied within the scope of the appended claims. For instance, the steps of the inventive method as described above may be performed at different locations, as will be described with three examples below. Note that these variations may also be combined.

In one embodiment the steps are performed in the pen and in a mail client in a personal computer. The mail client then receives a regular email. When the user chooses "handwritten reply" in a graphical interface, the client initiates a printer to print out the email, a position coding pattern and an address parameter. The pen generates an information sequence as a reply and records the address parameter. In principle, also the printed out incoming email message may be recorded by the pen (which in this case should be able to record text and detect positions simultaneously), or may be transmitted, via for instance a radio interface, to the pen. With this information at hand, the pen may create a regular email, store it and send it when a network connection has been established. Such a connection may be established by means of for instance a BLUETOOTH link between the drawing device and a PC, which is in turn connected to a network.

In another embodiment the combining of the address parameter and the information sequence may be performed in the mail client. Then when the client receives a regular email message this message is stored in the computer and an identity reference, corresponding to the email, is created. The message, the identity reference and a position coding pattern is printed out by a printer. The user generates an information sequence by writing a response message and records the identity reference. The generated information is transferred to the email client in the personal computer. The client according to the invention may operate not only in a PC, but also in a PDA, a mobile phone, the drawing device itself or in any other device. Subsequently, the client may create a message based on the received information sequence and send this as a response to the sender of the incoming message. In this embodiment the identity reference may be constituted by a particular domain of the position coding pattern. The user then does not need to specifically record an address parameter. Instead, the client may identify the reference identity, and hence the email that is responded to, simply by finding out which part of the position coding pattern that is used.

In yet another embodiment, steps may also be performed in an email server with which the email client communicates in a client-server mode and the server preferably is connected to the internet. The server then receives a regular email. This email is stored and a reference identity, corresponding to the email is created. The email and the reference identity are sent to the email client which operates in a personal computer. The email client instructs a printer to printout the incoming email message, the reference identity and a position coding pattern on a sheet of paper. As in the previous embodiment, the client then receives the reference identity as well as the position data that constitutes an information sequence. The reference identity and the information sequence are passed on to the server that generates a regular email message and sends it to a recipient that corresponds to the reference identity. Also in this embodiment the position coding pattern may constitute a reference identity. The server then instructs the email client as to which part (domain) of the position coding pattern that should be used when the sheet of paper is printed. The server may then derive the reference identity from the information sequence that includes position data. Position data from a certain domain of the global position coding pattern corresponds to a certain reference identity and hence to a particular recipient. In principle, the email client receiving the information sequence from the pen need then not be the same as the email client that initiated the printout of the sheet of paper. The above mentioned email server may register the used domain of the position coding pattern, in a global pattern lookup server (GPLS), as associated with a message handled by the email server. An email client, receiving position data from a pen, may thus look up the relevant email server in the GPLS and subsequently route the position data/information sequence to this email server.

The invention claimed is:

1. A method for generating a message that is intended to be sent to a destination, comprising:
   sending an address parameter, that corresponds to the destination, to a printer unit;
   printing on a sheet of paper, using the printer unit, a position-coding pattern and said address parameter;
   generating an information sequence by writing on the sheet of paper with a drawing device, the drawing device being capable of detecting positions on the sheet of paper by reading the position-coding pattern;
   recording the address parameter from the printed sheet using the drawing device; and
   generating the message based on the recorded address parameter and the information sequence.

2. A method according to claim 1, wherein the address parameter includes at least information corresponding to an address in an e-mail system.

3. A method according to claim 1, wherein the address parameter includes at least a reference identity, that identifies an address in a server unit.

4. A method according to any one of the preceding claims, wherein the message is a reply to an incoming message and wherein the address parameter corresponds to the address of at least the sender of the incoming message.

5. A method according to claim 4, further comprising:
   printing the contents of the incoming message on the sheet of paper in addition to the position-coding pattern and the address parameter.

6. A method according to claim 5, further comprising:
   recording the positional relationship on the sheet of paper between the contents of the incoming message and the information sequence; and
   wherein the contents of in the incoming message are included in the generated message with said positional relationship retained.

7. A method according to claim 1, in which the message is intended to be sent to a user-defined subset of a group of recipients and in which the identities of this group of recipients are printed out on the sheet of paper.

8. A method according to claim 1, further comprising:
   combining, in the drawing device, the recorded address parameter and the information sequence; and
   wherein the message is generated based on the combined information.

9. A method according to claim 8, further comprising:
generating and storing the message in the drawing device; and
subsequently sending the message when the drawing device makes contact with a network.

10. A method according to claim 1, further comprising:
transmitting the recorded address parameter and the information sequence from the drawing device to a server unit; and
wherein the message is generated in the server unit.

11. A computer readable medium encoded with computer executable instructions for generating a message that is intended to be sent to a destination, the instructions causing a computer system to execute the steps of:
sending an address parameter, that corresponds to the destination, to a printer unit to be printed along with a position-coding pattern on a sheet of paper;
receiving an information sequence generated by writing on the sheet of paper with a drawing device, the drawing device being capable of detecting positions on the sheet of paper by reading the position-coding pattern;
receiving the address parameter from the drawing device after having been read from the printed sheet of paper; and
generating the message based on the read address parameter and the information sequence.

12. A computer readable medium having encoded with computer executable instructions for generating a message, which is a reply to an incoming message and which is intended to be sent to a destination, the instructions causing a computer system to execute the steps of:
sending an address parameter, that corresponds to an address of a sender of the incoming message, and the contents of the incoming message to a printer unit to be printed along with a position-coding pattern on a sheet of paper;
receiving an information sequence generated by writing on the sheet of paper with a drawing device, the drawing device being capable of detecting positions on the sheet of paper by reading the position-coding pattern;
receiving the address parameter from the drawing device after being read by the drawing device from the printed sheet of paper and
generating the message based on the read address parameter and the information sequence.

13. A method for generating a message, which is a reply to an incoming message and which is intended to be sent to a destination, comprising:
sending an address parameter, that corresponds to an address of a sender of the incoming message, to a printer unit;
printing, using the printer unit, a position-coding pattern, the contents of the incoming message, and said address parameter on a sheet of paper;
generating an information sequence by writing on the sheet of paper with a drawing device, the drawing device being capable of detecting positions on the sheet of paper by reading the position-coding pattern;
recording the address parameter printed on the sheet of paper using the drawing device; and
generating the message based on the recorded address parameter and the information sequence.

14. Method according to claim 13, wherein printing the position-coding pattern, the contents of the incoming message, and the address parameter comprises:
printing a message box containing the contents of the incoming message, and a reply box on the sheet of paper; and
wherein the information sequence is at least partly generated by the user writing within the reply box with the drawing device.

15. Method according to claim 14, wherein the message box and the reply box are visually separated.

16. Method according to claim 13, further comprising:
recording the positional relationship on the sheet of paper between the contents of the incoming message and the information sequence; and
wherein the generated message includes the contents of the incoming message with said positional relationship retained.

17. Method according to any of claims 13–16, wherein the address parameter further corresponds to other recipients of the incoming message; and
wherein the printed sheet includes the other recipients of the incoming message.

18. An electronic mail client for installation on a device for communicating with a mail server located in any domain on the Internet, said device being connected to the Internet, a printer unit, and an electronic display, said electronic mail client causing a computer system to execute the steps of:
displaying on the electronic display, upon receipt of an incoming electronic mail message from the mail server, an incoming electronic mail message;
displaying on the electronic display an option for generating, based on the incoming electronic mail message, an electronic reply message including handwritten information; and
sending, upon detection of selection of said option, an address parameter corresponding to an Internet mail address of the sender of the incoming electronic mail message to a printer unit to be printed, along with a position-coding pattern, on a sheet of paper; and
generating the electronic reply message based on information obtained from the printed sheet using a drawing device, the drawing device being capable of detecting positions on the printed sheet by reading the position-coding pattern.

19. The electronic mail client according to claim 18, wherein generating the electronic reply message comprises:
receiving an information sequence generated by writing on the printed sheet with the drawing device;
receiving the address parameter from the drawing device after being read from the printed sheet; and
wherein the generated electronic reply message is based on the information sequence and the read address parameter, upon receipt thereof from the drawing device, to form said electronic reply message including handwritten information.

20. The electronic mail client according to claim 19, further comprising:
sending the contents of the incoming electronic mail message to the printer unit to be printed along with the address parameter and the position-coding pattern on the sheet of paper.

21. The electronic mail client according to claim 20, further comprising:
storing the contents of the incoming electronic mail message in a memory associated with said device;
retrieving the contents of the incoming electronic mail message from the memory, upon receipt of the information sequence and the read address parameter from the drawing device; and wherein the generated electronic reply message includes the contents of the incoming electronic mail message.

22. The electronic mail client according to claim 21, further comprising:
associating the position-coding pattern with said contents of the incoming electronic mail message to control the printer unit to print said contents in a given positional relationship to said position-coding pattern; and
wherein said positional relationship is retained in the generated electronic reply message.

23. The electronic mail client according to claim 18, further comprising:
extracting the address parameter from the incoming electronic mail message as received from the mail server.

24. The electronic mail client according to claim 23, wherein generating the electronic reply message comprises:
receiving, from the drawing device, an information sequence generated by writing on the printed sheet with the drawing device;
receiving the address parameter from the drawing device after being read from the printed sheet;
sending the information sequence and the read address parameter, upon receipt thereof to the mail server; and
wherein the electronic reply message is generated in the mail server.

25. The electronic mail client according to claim 24, further comprising:
sending the contents of the incoming electronic mail message to the printer unit to be printed along with the address parameter and the position-coding pattern on the sheet of paper.

26. The electronic mail client according to claim 25, further comprising:
associating said position-coding pattern with said contents of the incoming electronic mail message to control the printer unit to print said contents in a given positional relationship to said position-coding pattern, so that said information sequence is generated with said given positional relationship to said contents; and
sending the information sequence to the mail server with said positional relationship retained.

27. The electronic mail client according to any one of claims 19–26, wherein the address parameter is a reference identity of the position-coding pattern to be printed on said the sheet of paper.

28. The electronic mail client according to claim 27, wherein the reference identity corresponds to a range of positions coded by the position-coding pattern to be printed on the sheet of paper.

29. The electronic mail client according to any one of claims 19–26, wherein the address parameter is a reference identity that identifies said Internet mail address in the device or in the mail server.

30. The electronic mail client according to claim 18, further comprising:
transmitting the contents of the incoming electronic mail message to the drawing device.

31. The electronic mail client according to claim 30, wherein transmitting the contents of the incoming electronic mail message includes sending said contents to the printer unit to be printed along with the address parameter and position-coding pattern on the sheet of paper in a format that the drawing device is capable of reading.

32. The electronic mail client according to claim 18, wherein the address parameter includes said Internet mail address.

33. The electronic mail client according to claim 32, wherein the printer unit is controlled to print said Internet mail address in alpha-numeric format on the sheet of paper.

34. The electronic mail client according to claim 32, wherein the printer unit is controlled to print said Internet mail address on said sheet of paper in a coded format that the drawing device is capable of reading.

35. The electronic mail client according to claim 18, wherein generating the electronic reply message comprises:
generating an information sequence by writing on the printed sheet with the drawing device;
reading the address parameter from the printed sheet with the drawing device;
converting the information sequence and the read address parameter into the electronic reply message; and
sending the electronic reply message to the mail server for delivering to the destination.

* * * * *